(12) United States Patent
Jia et al.

(10) Patent No.: US 7,319,570 B2
(45) Date of Patent: Jan. 15, 2008

(54) RANDOM VIBRATION AND SHOCK COMPENSATOR USING A DISTURBANCE OBSERVER

(75) Inventors: QingWei Jia, Singapore (SG); MingZhong Ding, Singapore (SG); KianKeong Ooi, Singapore (SG); Jianyi Wang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/230,168

(22) Filed: Sep. 19, 2005

(65) Prior Publication Data

US 2007/0064334 A1  Mar. 22, 2007

(51) Int. Cl.
*G11B 5/596* (2006.01)
(52) U.S. Cl. ............... 360/77.02; 360/77.07
(58) Field of Classification Search ............ None
See application file for complete search history.

(56) References Cited

U.S. PATENT DOCUMENTS

| | | |
|---|---|---|
| 3,947,881 A | 3/1976 | Dahill et al. |
| 3,997,876 A | 12/1976 | Frush |
| 4,006,394 A | 2/1977 | Cuda et al. |
| 4,477,755 A | 10/1984 | Rickert |
| 4,488,189 A | 12/1984 | Axmear et al. |
| 4,510,537 A | 4/1985 | Yoshida et al. |
| 4,575,776 A | 3/1986 | Stephens et al. |
| 4,697,127 A | 9/1987 | Stitch et al. |
| 4,792,737 A | 12/1988 | Goff et al. |
| 4,792,870 A | 12/1988 | Pinson |
| 4,858,041 A | 8/1989 | Brown |
| 4,862,298 A | 8/1989 | Genheimer et al. |
| 4,879,612 A | 11/1989 | Freeze et al. |
| 4,890,172 A | 12/1989 | Watt et al. |
| 4,894,599 A | 1/1990 | Ottesen et al. |
| 4,914,644 A | 4/1990 | Chen et al. |
| 4,940,924 A | 7/1990 | Mizuno et al. |
| 4,954,905 A | 9/1990 | Wakabashi et al. |
| 4,979,059 A | 12/1990 | Sengoku |
| 5,010,535 A | 4/1991 | Davis |
| 5,119,250 A | 6/1992 | Green et al. |
| 5,126,897 A | 6/1992 | Ogawa et al. |
| 5,128,813 A | 7/1992 | Lee |
| 5,146,440 A | 9/1992 | Yamaguchi et al. |
| 5,151,639 A | 9/1992 | Hasegawa et al. |
| 5,155,422 A * | 10/1992 | Sidman et al. ............ 318/560 |
| 5,164,931 A | 11/1992 | Yamaguchi et al. |
| 5,182,684 A | 1/1993 | Thomas et al. |

(Continued)

OTHER PUBLICATIONS

N. Dennis, "Wideband Passive Mechanical Mounting System For Disk Drives On Boats In Rough Seas," Oceans '97 MTS, IEEE Conference Proceedings, p. 1488-1495, (Oct. 6, 1987).

(Continued)

*Primary Examiner*—Andrew L. Sniezek
(74) *Attorney, Agent, or Firm*—Westman, Champlin & Kelly, P.A.

(57) ABSTRACT

A data storage device adapted to compensate for physical disturbances has a storage medium, a read-write mechanism positionable relative to the storage medium, and a disturbance observer. The read-write mechanism is adapted to read and write data. The disturbance observer compensates a position of the read-write mechanism according to low-frequency components of physical disturbances.

19 Claims, 8 Drawing Sheets

U.S. PATENT DOCUMENTS

| | | |
|---|---|---|
| 5,231,550 A | 7/1993 | Hashimoto |
| 5,235,472 A | 8/1993 | Smith |
| 5,251,194 A | 10/1993 | Yoshimoto et al. |
| 5,252,511 A | 10/1993 | Bhan et al. |
| 5,254,920 A | 10/1993 | Agarwal et al. |
| 5,257,252 A | 10/1993 | Barnes et al. |
| 5,325,247 A | 6/1994 | Ehrlich et al. |
| 5,339,206 A | 8/1994 | Takahashi |
| 5,343,131 A | 8/1994 | Baumann |
| 5,369,345 A | 11/1994 | Phan et al. |
| 5,371,449 A | 12/1994 | Tajima et al. |
| 5,373,213 A | 12/1994 | Smith |
| 5,404,252 A | 4/1995 | Nagasawa et al. |
| 5,404,253 A | 4/1995 | Painter |
| 5,404,255 A | 4/1995 | Kobayashi et al. |
| 5,404,492 A | 4/1995 | Moraru et al. |
| 5,416,646 A | 5/1995 | Shirai |
| 5,426,545 A | 6/1995 | Sidman et al. |
| 5,444,582 A | 8/1995 | Suzuki |
| 5,444,583 A | 8/1995 | Ehrlich et al. |
| 5,459,624 A | 10/1995 | Erickson et al. |
| 5,465,183 A | 11/1995 | Hattori |
| 5,469,414 A | 11/1995 | Okamura |
| 5,473,482 A | 12/1995 | Saito et al. |
| 5,476,015 A | 12/1995 | Valent |
| 5,483,438 A * | 1/1996 | Nishimura .................. 700/29 |
| 5,490,120 A | 2/1996 | Li et al. |
| 5,585,976 A | 12/1996 | Pham |
| 5,602,689 A | 2/1997 | Kadlec et al. |
| 5,616,869 A | 4/1997 | Valent |
| 5,636,193 A | 6/1997 | Ohmi |
| 5,638,230 A | 6/1997 | Kadlec |
| 5,646,797 A | 7/1997 | Kadlec et al. |
| 5,654,840 A | 8/1997 | Patton et al. |
| 5,663,847 A | 9/1997 | Abramovitch |
| 5,667,809 A | 9/1997 | Trevino et al. |
| 5,668,680 A | 9/1997 | Tremaine |
| 5,675,450 A | 10/1997 | Kadlec |
| 5,675,558 A | 10/1997 | Katoh |
| 5,677,609 A | 10/1997 | Khan et al. |
| 5,680,271 A | 10/1997 | Yatsu |
| 5,684,650 A | 11/1997 | Kadlec et al. |
| 5,684,972 A | 11/1997 | Hill et al. |
| 5,699,207 A | 12/1997 | Supino et al. |
| 5,721,648 A | 2/1998 | Phan et al. |
| 5,731,973 A | 3/1998 | Takaishi et al. |
| 5,781,363 A | 7/1998 | Rowan et al. |
| 5,829,011 A | 10/1998 | Glover |
| 5,831,787 A | 11/1998 | Yoshida et al. |
| 5,835,302 A | 11/1998 | Funches et al. |
| 5,844,744 A | 12/1998 | Suzuki et al. |
| 5,847,527 A | 12/1998 | Iwashiro |
| 5,847,895 A | 12/1998 | Romano et al. |
| 5,859,742 A | 1/1999 | Takaishi |
| 5,867,342 A | 2/1999 | Hattori |
| 5,870,242 A | 2/1999 | Abe et al. |
| 5,872,674 A | 2/1999 | Eddy |
| 5,907,450 A | 5/1999 | Ishikawa |
| 5,912,782 A | 6/1999 | Lee et al. |
| 5,914,829 A | 6/1999 | Kadlec et al. |
| 5,914,830 A | 6/1999 | Kadlec et al. |
| 5,917,672 A | 6/1999 | Pham et al. |
| 5,926,340 A | 7/1999 | Sim |
| 5,930,068 A | 7/1999 | Gregg et al. |
| 5,940,239 A | 8/1999 | Lee et al. |
| 5,949,605 A | 9/1999 | Lee et al. |
| 5,949,608 A | 9/1999 | Hunter |
| 5,963,393 A | 10/1999 | Rowan et al. |
| 5,978,752 A | 11/1999 | Morris |
| 5,999,361 A | 12/1999 | Kim |
| 6,002,544 A | 12/1999 | Yatsu |
| 6,005,742 A | 12/1999 | Cunningham et al. |
| 6,023,390 A | 2/2000 | Kang |
| 6,028,409 A | 2/2000 | Wierda |
| 6,029,095 A | 2/2000 | Boissy et al. |
| 6,031,684 A | 2/2000 | Gregg |
| 6,046,878 A | 4/2000 | Liu et al. |
| 6,052,252 A | 4/2000 | Kim |
| 6,061,200 A | 5/2000 | Shepherd et al. |
| 6,072,654 A | 6/2000 | Eddy |
| 6,084,742 A | 7/2000 | Takaishi et al. |
| 6,088,186 A | 7/2000 | Carlson |
| 6,088,187 A | 7/2000 | Takaishi |
| 6,088,188 A | 7/2000 | Serrano et al. |
| 6,091,567 A | 7/2000 | Cooper et al. |
| 6,097,564 A | 8/2000 | Hunter |
| 6,097,565 A | 8/2000 | Sri-Jayantha et al. |
| 6,101,058 A | 8/2000 | Morris |
| 6,122,135 A | 9/2000 | Stich |
| 6,166,871 A | 12/2000 | Takaishi |
| 6,166,876 A | 12/2000 | Liu |
| 6,169,641 B1 | 1/2001 | Hayner |
| 6,185,171 B1 | 2/2001 | Bassett et al. |
| 6,185,467 B1 | 2/2001 | Romano et al. |
| 6,211,638 B1 | 4/2001 | Heaton et al. |
| 6,219,196 B1 | 4/2001 | Semba et al. |
| 6,219,198 B1 | 4/2001 | Dobbek et al. |
| 6,239,940 B1 | 5/2001 | Sasamoto et al. |
| 6,243,226 B1 | 6/2001 | Jeong |
| 6,252,364 B1 | 6/2001 | Chiang et al. |
| 6,256,163 B1 | 7/2001 | Schmidt et al. |
| 6,282,052 B1 | 8/2001 | Galloway et al. |
| 6,295,507 B1 | 9/2001 | Sasamoto et al. |
| 6,304,409 B1 | 10/2001 | Allsup |
| 6,310,743 B1 | 10/2001 | Haines et al. |
| 6,310,747 B1 | 10/2001 | Emo et al. |
| 6,313,964 B1 | 11/2001 | Lamberts et al. |
| 6,320,721 B1 | 11/2001 | Magee et al. |
| 6,347,017 B1 | 2/2002 | Carlson |
| 6,347,018 B1 | 2/2002 | Kadlec et al. |
| 6,369,972 B1 | 4/2002 | Codilian et al. |
| 6,381,088 B1 | 4/2002 | Despain et al. |
| 6,384,994 B1 | 5/2002 | Smith et al. |
| 6,389,384 B1 | 5/2002 | Hampshire et al. |
| 6,404,581 B1 | 6/2002 | Shah |
| 6,414,813 B2 | 7/2002 | Cvancara |
| 6,414,827 B1 | 7/2002 | Young et al. |
| 6,421,200 B2 | 7/2002 | Takaishi |
| 6,437,936 B1 | 8/2002 | Chen et al. |
| 6,441,988 B2 | 8/2002 | Kang et al. |
| 6,465,981 B2 | 10/2002 | Zhang et al. |
| 6,490,118 B1 | 12/2002 | Ell et al. |
| 6,504,670 B1 | 1/2003 | Dittmar |
| 6,519,109 B1 | 2/2003 | Price et al. |
| 6,525,897 B2 | 2/2003 | Despain et al. |
| 6,538,839 B1 | 3/2003 | Ryan |
| 6,549,364 B1 | 4/2003 | Shih |
| 6,563,665 B1 | 5/2003 | Ell |
| 6,563,666 B1 | 5/2003 | LaPanse |
| 6,570,733 B1 | 5/2003 | Waugh et al. |
| 6,576,070 B2 | 6/2003 | Kaneoka |
| 6,577,462 B1 | 6/2003 | Hamada et al. |
| 6,578,106 B1 | 6/2003 | Price |
| 6,580,579 B1 | 6/2003 | Hsin et al. |
| 6,580,581 B1 | 6/2003 | Bui et al. |
| 6,590,734 B1 | 7/2003 | Ell |
| 6,594,117 B2 | 7/2003 | Dague et al. |
| 6,597,532 B1 | 7/2003 | Usui et al. |
| 6,674,600 B1 | 1/2004 | Codilian et al. |
| 6,680,813 B2 | 1/2004 | Dague et al. |
| 6,693,764 B1 | 2/2004 | Sheh et al. |
| 6,704,160 B2 | 3/2004 | Takakura |
| 6,724,563 B2 | 4/2004 | Kobayashi et al. |
| 6,724,564 B1 | 4/2004 | Codilian et al. |

| | | |
|---|---|---|
| 6,728,061 B2 | 4/2004 | Takaishi |
| 6,744,591 B2 | 6/2004 | Nakagawa et al. |
| 6,751,045 B1 | 6/2004 | Morris et al. |
| 6,760,172 B1 | 7/2004 | Hamaguchi et al. |
| 6,768,607 B2 * | 7/2004 | Ottesen et al. ............ 360/77.02 |
| 6,785,075 B2 | 8/2004 | Bryant et al. |
| 6,785,087 B2 | 8/2004 | Saito |
| 6,785,204 B1 | 8/2004 | Okuyama et al. |
| 6,791,785 B1 | 9/2004 | Messenger et al. |
| 6,822,825 B2 | 11/2004 | Herndon et al. |
| 6,826,002 B2 | 11/2004 | Yanagimoto |
| 6,831,809 B2 | 12/2004 | Kagami et al. |
| 6,839,194 B2 | 1/2005 | Koyanagi |
| 6,847,503 B2 | 1/2005 | Zhang et al. |
| 6,847,598 B2 | 1/2005 | Ikai |
| 6,870,342 B2 | 3/2005 | Naik |
| 6,873,490 B2 | 3/2005 | Guo et al. |
| 6,876,168 B1 | 4/2005 | Luo et al. |
| 6,898,046 B2 | 5/2005 | Sri-Jayantha et al. |
| 6,898,069 B2 | 5/2005 | Yamaguchi et al. |
| 2001/0036026 A1 | 11/2001 | Chen et al. |
| 2003/0007276 A1 | 1/2003 | Satoh |
| 2003/0058571 A1 | 3/2003 | Kisaka |
| 2003/0218819 A1 | 11/2003 | Sri-Jayantha et al. |
| 2003/0218822 A1 | 11/2003 | Sri-Jayantha et al. |
| 2003/0218823 A1 | 11/2003 | Dang et al. |
| 2004/0080860 A1 | 4/2004 | Inaji |
| 2004/0233569 A1 | 11/2004 | Chung |
| 2005/0041331 A1 | 2/2005 | Bement et al. |
| 2005/0105205 A1 | 5/2005 | Suzuki |
| 2005/0111131 A1 | 5/2005 | Anderson et al. |
| 2006/0002251 A1 * | 1/2006 | Yoshikawa et al. ...... 369/44.29 |
| 2006/0176605 A1 * | 8/2006 | Baek et al. .............. 360/77.04 |

OTHER PUBLICATIONS

P. Srikrishna & K. Kasetty, "Predicting Track Misregistration (TMR) From Disk Vibration Of Alternate Substrate Materials," IEEE Transactions On Magnetics, vol. 36 (No. 1), p. 171-176, (Jan. 1, 2000).

S. Subramanian, R. Hariharan, B. Landa & T.P. Feist, "Experimental and analytical Characterization Of The Mechanical Performance Of Discs," Optical Data Storage, Conference Digest, p. 209-211, (May 14, 2000).

G. Tunstall, W.Clegg, D.F.L. Jenkins, & C. Chilumbu, "Head-Media Interface Instability Under Hostile Operating Conditions," IEEE Transactions On Instrumentation And Measurement, vol. 51, (No. 2), p. 293-298, (Apr. 1, 2002).

A. Beliveau, G.T. Spencer, K.A. Thomas, & S.L. Roberson, "Evaluation Of MEMS Capacitive Accelerometers," IEEE Design And Test Of Computers, vol. 16 (No. 4), p. 48-56, (Oct. 1, 1999).

* cited by examiner

RANDOM VIBRATION AND SHOCK COMPENSATOR USING A DISTURBANCE OBSERVER

FIELD OF THE INVENTION

The present invention relates generally to positioning of control objects, and more particularly, to shock and vibration compensation systems for correcting off track errors of read-write heads within data storage devices.

BACKGROUND OF THE INVENTION

Disc drives are data storage devices adapted to store and retrieve user data. A typical disc drive stores data on one or more rotating discs. An actuator positions a corresponding number of data transducing heads (read/write heads) over tracks defined on the rotating discs to access data stored in the tracks.

Generally, track following servo systems are used in hard disc drives to hold the data transducing heads to very small off-track errors in order to support the increasing data density (track density) of contemporary storage devices. Tracking errors can be induced due to many effects including disc and bearing runout, servo-track-writer induced irregularities, electronic noise, spindle and actuator resonances, and external shock and vibration excitations.

Small form factor hard discs are often used in portable computing environments, such as laptop computers, handheld music players, portable video games, and the like, where there is an increased likelihood of exposure to continuous shocks and random vibrations due to physical activities such as jogging, cycling and the like. Studies of shock and vibration levels in hard disc drives embedded in portable devices during physical activities have shown that shock and vibration levels during jogging can be represented by a continuous series of shock pulses and random vibrations. In portable audio devices, such as MP3 players, which are often used by joggers and cyclists during exercise activities, it is desirable to have a smooth flow of music without interruption. However, external shocks to such portable devices may cause the read-write head in the disc drive to move off track, causing the read-write head to be unable to load information from the storage medium. While such devices often use a memory buffer, the read-write head of the storage device has to recover between shocks in order to continue to read data into the memory buffer, or the system will stop operating.

Shocks induced by jogging typically have a high amplitude and long duration. Traditional servo compensation schemes are not capable of suppressing such disturbances quickly enough to produce satisfactory performance in portable devices. Embodiments of the present invention provide solutions to these and other problems, and offer other advantages over the prior art.

SUMMARY OF THE INVENTION

A storage device has a disturbance observer adapted to compensate for shocks and random vibrations. The storage device has a storage medium, a read-write mechanism adapted to read and to write data from and to the storage medium, and a disturbance observer. The disturbance observer compensates a position of the read-write mechanism responsive to low frequency components of physical disturbances. In one embodiment, the storage device includes a trigger mechanism adapted to enable the disturbance observer only if a position error exceeds a predetermined threshold.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
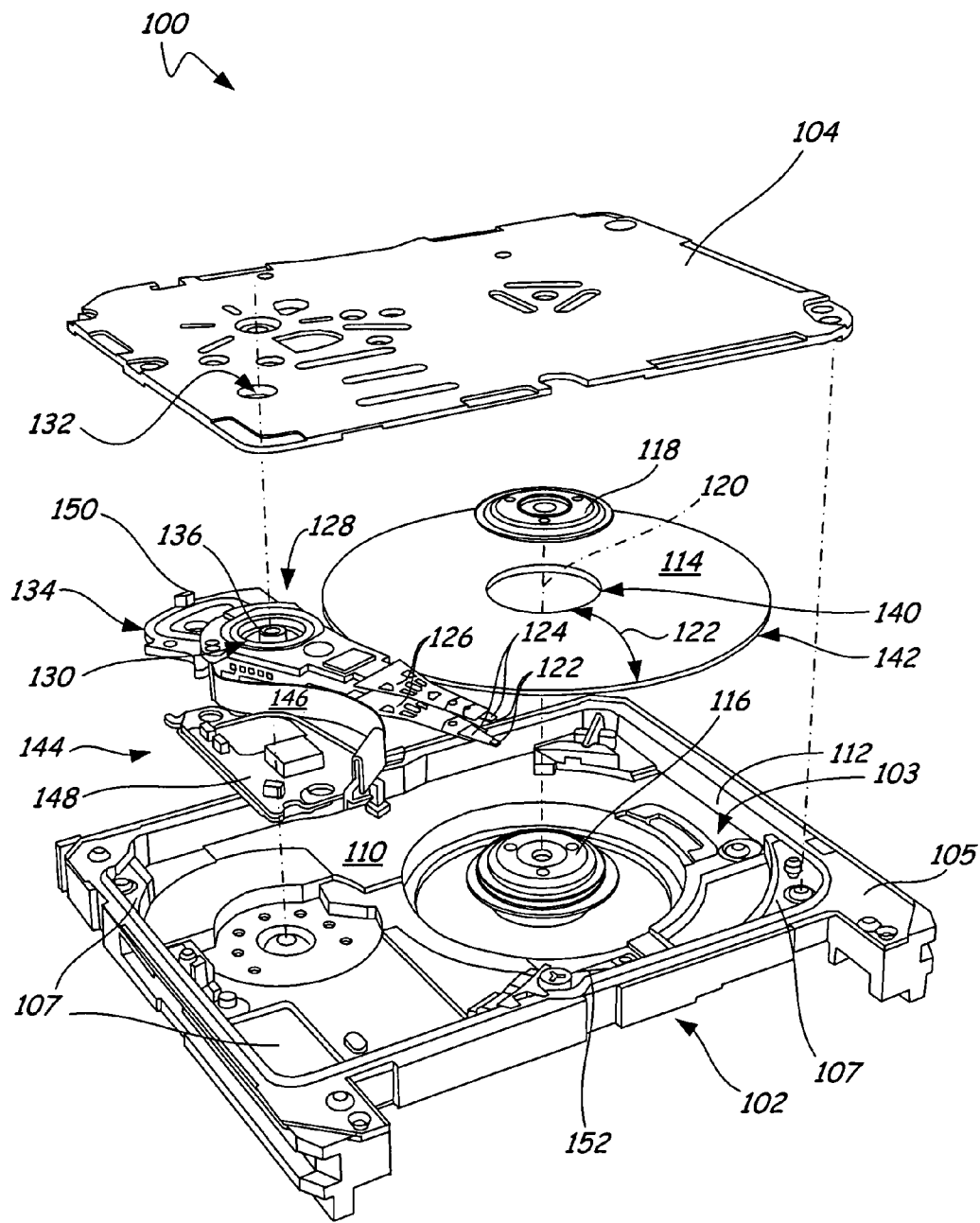
FIG. 1 is an isometric exploded view of a low profile storage device according to an embodiment of the present invention.

FIG. 1 is disc drive 100 in which embodiments of the present invention are used. Disc drive 100 includes a housing with a base 102 and a cover 104, which form a chassis for components of the disc drive 100. The cover 104 attaches to the base 102 to form a chamber 110 enclosed by a perimeter wall 112. The base 102 includes a floor 103 that is recessed below a raised deck 105, which extends about a perimeter of the base 102 to form the perimeter wall 112. Shelves 107 are recessed below the raised deck 105 and above the floor 103 and are adapted to interface with the cover 104. The components of the storage device 100 are assembled to the base 102 and are enclosed within chamber 110 of the housing.

Disc drive 100 further includes a disc 114, which is mounted on a spindle motor assembly 116 by disc clamp 118. Disc 114 is mounted for rotation about a central axis 120. Each disc surface has an associated disc head slider with a corresponding transducer head 122, which is mounted to disc drive 100 for communication with the surface of the disc 114. In the example shown in FIG. 1, the transducer heads 122 are supported by suspensions 124, which are in turn attached to track accessing arms 126 of an actuator 128. The actuator 128 is adapted to move the actuator arms 126 to position the transducer heads 122 relative to tracks on the disc 114. Actuator 128 is coupled to base 102 by bearing assembly 130. A fastener (not shown) extends through opening 132 in cover 104 to secure the actuator 128 between the cover 104 and the base 102.

Actuator 128 can be of a type known as a rotary moving coil actuator, which includes a voice coil motor (VCM), shown generally at 134. Voice coil motor 134 rotates actuator 128 with its attached heads 124 about a pivot shaft 136 to position heads 124 over a desired data track along an arcuate path 138 between a disc inner diameter 140 and a disc outer diameter 142. Voice coil motor 134 is driven by drive circuitry 144, which includes a printed circuit board (PCB) 146 and flex circuit 148. The flex circuit 148 extends from the PCB 146 to the actuator 128 to provide an electrical interface for the heads 122 and to energize the VCM 134 to position the heads 122 relative to data tracks on the disc 114. The drive circuitry 144 can include a processor and firmware, which together operate as a controller (shown in FIG. 4) adapted to position the transducer heads 122 relative to the storage medium 114. In general, the VCM 134 rotates the actuator 128 to position the heads 122 by supplying current to a bobbin 150 on the actuator 128. The bobbin 150 is interposed in a magnetic field formed between opposing magnetic poles (not shown). In this embodiment, the read-write heads 122 are supported by a load/unload ramp 152 during intermittent or non-operation periods. The load/unload ramp 152 is connected to the base 102.

It should be understood by workers skilled in the art that the disc drive 100 in FIG. 1 is provided as an example of a suitable storage system in which embodiments of the present invention can be used. Embodiments may be used with any storage device with a controlled read/write mechanism that is positionable relative to a storage medium of the storage device. Additionally, the random vibration and shock compensation (RVSC) scheme can also be used with other mechanical control systems where fast compensation for shock and vibration is desirable.

Generally, in the figures presented below, reference numbers are reused to refer to the similar elements or blocks. As additional features are introduced, new reference numbers are added such that the first digit of the reference numeral corresponds to the figure in which the feature is first depicted.

Figure 2:
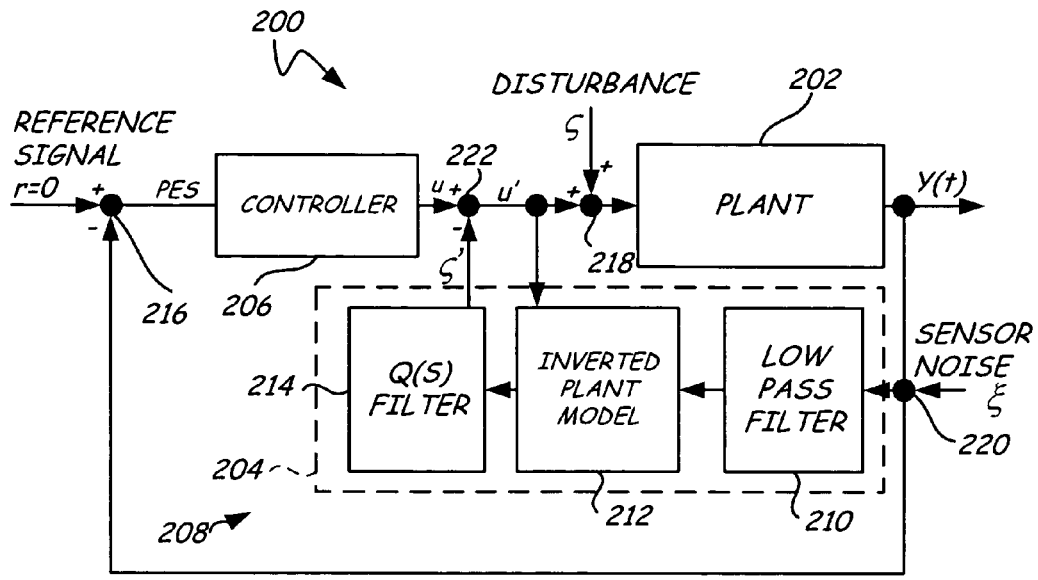
FIG. 2 is a simplified block diagram of a vibration and shock compensation system according to an embodiment of the present invention.
Figure 3:
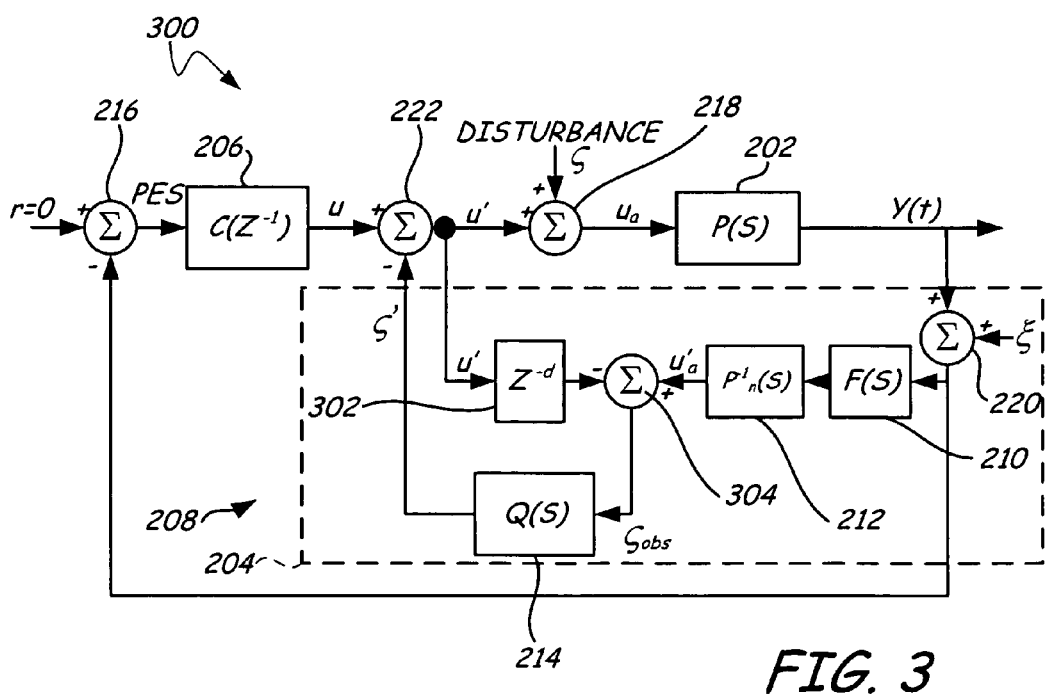
FIG. 3 is a simplified block diagram of a random vibration and shock compensation (RSVC) system for controlling a position of a read-write head relative to a storage medium according to an embodiment of the present invention.
Figure 4:
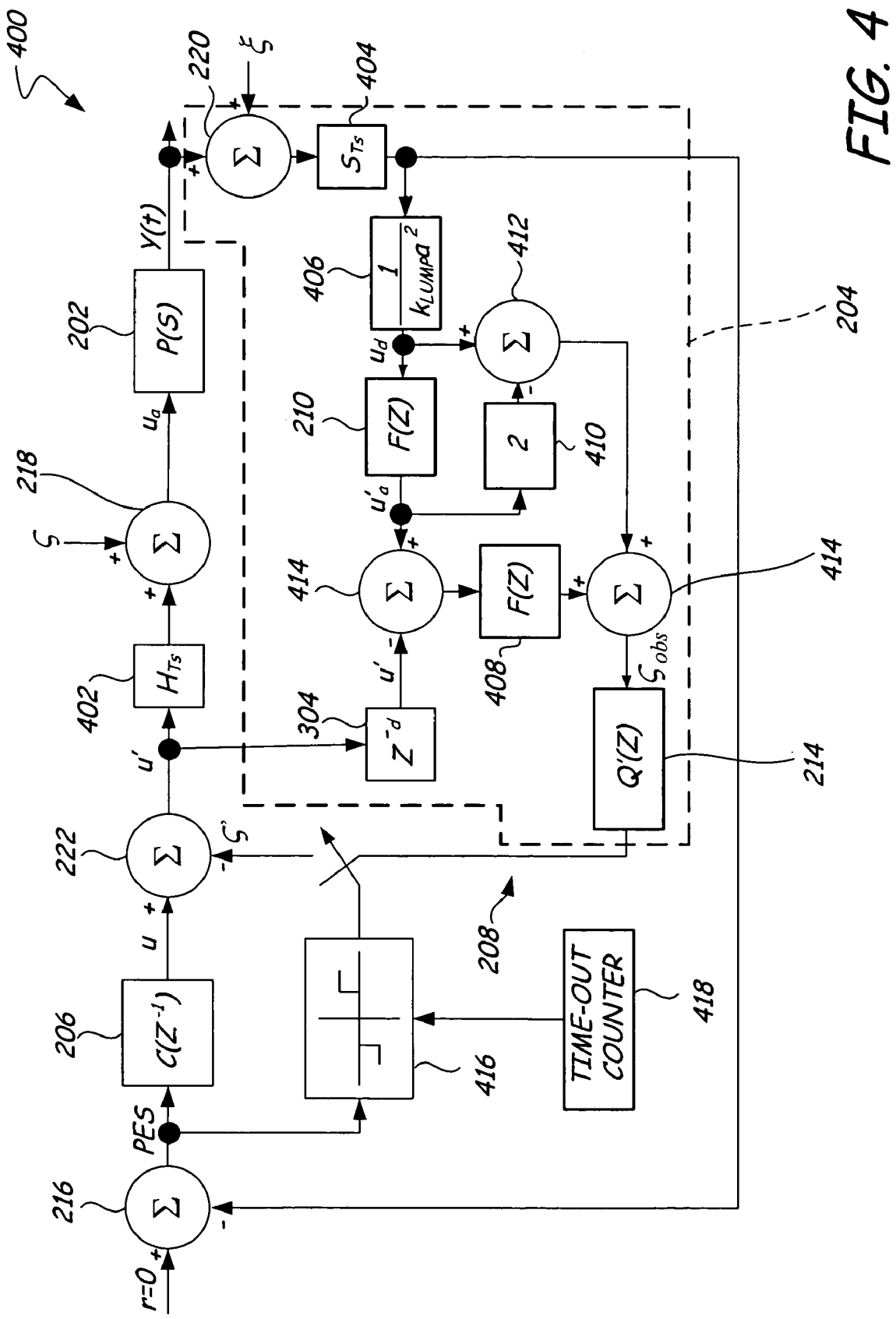
FIG. 4 is a simplified plant diagram of a RVSC system according to an embodiment of the present invention.

FIG. 2 is a simplified block diagram of an embodiment of a system 200 with an object to be controlled (plant 202) and with a random vibration and shock compensation (RVSC) scheme (observer 204) that assists a controller 206 (denoted as "C(Z$^{-1}$)" in FIGS. 3 and 4) in controlling a position of the plant 202. The system 200 can be included in circuitry of a storage device, for example, such as within the drive circuitry 144 shown in FIG. 1. Generally, the observer 204 is adapted to estimate disturbances based on a plant output (y(t)) and to generate a disturbance compensation signal to compensate a control signal from the controller 206 via a feedback loop 208. The observer includes a low-pass filter 210, an inverted plant model 212 (such as a transfer function model selected to be an inverse of a transfer function related to the plant 202), a summing node 220, and a Q-filter 214.

A reference input (r=0) is applied to an input of the controller 206. The controller 206 generates a controller output (u) to regulate the plant 202 to follow the reference input (r). The plant 202, which may experience disturbances (ζ) such as external shocks or random vibrations, generates a plant output signal (y(t)) related to an actual position of the plant 202 relative to a desired position. The output signal (y(t)) may contain measurement noise (ξ) (such as sensor noise). Output signal (y(t)) is fed back and subtracted from the reference signal (r) at a controller input node 216 to create a position error signal (PES) at the input of the controller 206.

Additionally, the plant output (y(t)) and sensor noise (ξ) are processed by the observer 204. Generally, sensor noise (ξ) is high frequency noise relative to the frequency range for random vibration and/or shock rejection, which is typically within a range of 10 Hz to 500 Hz. The observer 204 includes low-pass filter 210 positioned between the output summing node 220 and the inverted plant model 212 to remove the high frequency sensor noise (ξ). The inverted plant model 212 estimates a disturbance (ζ) based on the controller output (u) and on the plant output (y(t)) and provides an observed disturbance signal (ζ$_{obs}$) to the Q-filter 214. The Q-filter 214 removes high frequency content from the observed disturbance signal (ζ$_{obs}$) to produce a disturbance compensation signal (ζ'), which contains low frequency signals of the observed disturbance (ζ$_{obs}$) for compensating the controller output (u) at summing node 222 to produce a control signal (u'). By designing the low-pass filter 210 with unity DC gain, the low-pass filter attenuates the sensor noise (ξ) in the high frequency range, while compensating or offsetting the effect of the disturbance in the low frequency range.

Disturbances (such as random vibrations and shocks) are modeled as an input to the plant 202 via summing node 218. Sensor noise (ξ) is modeled as an input to the feedback loop 208 via summing node 220. The plant 202 represents a model of mechanical aspects of the physical structure to be controlled. For example, in one embodiment, the plant 202 can represent mechanical aspects of the disc drive 100 (in FIG. 1), including the transducer head 122, the suspension 124, the actuator arm 126, the disc 114, the VCM 134, and various other components of the drive 100. In this instance, the plant 202 receives a control signal from controller 206 to position transducer heads 122 relative to selected tracks, and generates a plant output (y(t)) responsive to servo information read by the transducer heads 122 from the selected tracks on the disc 114.

FIG. 3 is simplified block diagram of a system 300 with an expanded view of the observer 204 in FIG. 2. The system 300 includes a plant 202, observer 204, and controller 206. The observer 204 includes low pass filter 210, inverted plant model 212, Q-filter 214, summing node 220, delay 302, and summing node 304. In general, the plant 202 represents an object to be controlled, which can be represented in the frequency domain by the following transfer function $$P(s) \approx \frac{k_{Lump}}{s^2} = P_n(s),$$

such that the plant 202 is a double integrator with a nominal plant gain parameter (K$_{LUMP}$), which is used to estimate the acceleration signal. The inverted plant model 212 can be represented by a transfer function in the frequency domain that is chosen to be an inverted model of the plant 202, such that the observer 204 includes a digital double differentiator that can be represented in the frequency domain by the following transfer function $$P_n^{-1}(s) = \frac{s^2}{k_{Lump}},$$

over a wide range of frequencies, such as from zero Hz to one KHz or two KHz, for example.

A reference input (r=0) is applied to an input of the controller 206. The controller 206 generates a controller signal (u) from which a disturbance compensation signal (ζ') is subtracted to form a control signal (u') to regulate the plant 202 to follow the reference input (r). Disturbances (λ), such as random vibrations and external shocks, are modeled as inputs to summing node 218 that alter the control signal (u') into a plant input ($u_a$).

The plant 202 responds to the plant input ($u_a$) and generates a plant output signal (y(t)) related to an actual position of the plant 202 relative to a desired position. The output signal (y(t)) and associated sensor noise (ξ) are fed back and subtracted from the reference signal (r) at a controller input node 216 to create the PES at the input of the controller 206.

Additionally, the plant output (y(t)) and sensor noise (ξ) are processed by the observer 204. Generally, sensor noise (ξ) is high frequency noise relative to the frequency range for random vibration and/or shock rejection, which is typically within a range of 10 Hz to 500 Hz. The observer 204 includes the low-pass filter 210 between output the summing node 220 and the inverted plant model 212 to remove the high frequency sensor noise (ξ). The inverted plant model 212 estimates a plant input ($u_a$') based on the filtered plant output (y(t)). The control signal (u') is also processed by the observer 204 through delay block 302 (denoted as $Z^{-d}$) and subtracted from the estimated plant input ($u_a$') to produce an observed disturbance signal ($\zeta_{obs}$). Delay block 302 represents a delay of d-steps to compensate for phase loss due to computational and other delays. Q-filter 214 processes the observed disturbance signal ($\zeta_{obs}$) to remove high frequency content. The resultant output of the observer 204 is a disturbance compensation signal (ζ'), which contains low frequency signals of the observed disturbance ($\zeta_{obs}$) for compensating the controller output (u) at summing node 222.

Unlike conventional random vibration and control systems, embodiments of the present invention filter out high frequency sensor noise (ξ) prior to estimating the plant input ($U_a$). By designing the low-pass filter F(s) 210 to be a low-pass filter with a unity DC gain, the sensor noise (ξ) can be attenuated in the high frequency range, and at the same time the effect of the disturbance (ζ) can be canceled in the low frequency range. In one embodiment, the low-pass filter F(s) 210 and the Q-filter 214 are chosen to be first-order Butterworth low-pass filters. First-order Butterworth low-pass filters are fairly simple and well-known filters, and thus the observer 204 is very simple to implement.

In general, the low-pass filter 210 is chosen such that its transfer function is as follows:

$$F(s) = \frac{1}{as+1},$$

where the parameter a determines the cut-off frequencies of F(s). The Q-filter is composed of a first order low-pass filter (such as function F(s) above) concatenated with another low-pass filter Q'(s) such that its transfer function is as follows:

$$Q(s) = \frac{1}{as+1}Q'(s),$$

where Q'(s) is also a low-pass filter, which can be of any desired order. For simplicity, Q'(s) can be chosen to be unity. In this case, the transfer function Q(s) is a simple first-order low-pass filter. Unfortunately, the frequency domain convolution ($F(s)P_n^{-1}(s)$) of the inverted plant model 212 and the low-pass filter 210 is a non-causal filter that cannot be implemented directly. However, by rearranging the transfer function of the feedback loop 208 ($F(s)P_n^{-1}(s)Q(s)$), the system 300 can be realized as shown below in FIG. 4.

FIG. 4 is a simplified block diagram of system 400 with an observer 204, where the low-pass filter 210, the inverted plant model 212, and the Q-filter 214 are rearranged such that the resultant transfer function is as follows:

$$FP_n^{-1}(s)Q(s) = \frac{Q'(s)s^2}{k_{lump}(as+1)^2} = \frac{Q'(s)}{k_{lump}a^2}\left(1 - \frac{2}{as+1} + \frac{1}{as+1^2}\right).$$

Following a forward path through the system 400, nominal feedback is subtracted from reference signal (r=0) at node 216 to produce a PES signal to the input of the controller 206. The controller 206 generates a controller output (u) from which a disturbance compensation signal (ζ'), if available, is subtracted at node 222 to produce a control signal (u'). The control signal (u') is received by holder 402, which represents a sample and hold circuit. The control signal (u') is provided to the plant 202 through summing node 218, where a disturbance (ζ) may be introduced to produce plant input ($u_a$). The plant 202 uses the plant input ($u_a$), for example, to position a read write mechanism (shown in FIG. 5) over a storage medium, such as storage medium 114 (in FIGS. 1 and 5). The plant 202 produces an output signal (y(t)) indicative of the plant position relative to data storage tracks on the storage medium, for example.

The plant output signal (y(t)) is then provided to the observer 204 for processing. The observer 204 includes summing node 220, sampler 404, divisor block 406

$$\left(\text{denoted by} \frac{1}{k_{LUMP}a^2}\right),$$

low pass filter 210, delay block 304, low pass filter 408, constant gain block 410, summing nodes 412 and 414, and Q-filter 214. In general, the output signal (y(t)) and measurement noise (ξ) are combined in summing node 220 and sampled by sampler 404 to produce the nominal feedback that is passed to summing node 216. Additionally, the nominal feedback is processed by divisor block 406, which reduces the magnitude of the nominal feedback signal by a constant (based on the lumped gain parameter $k_{LUMP}$ and on the parameter a which determines the cutoff frequency), producing a resultant product ($u_d$). The product ($u_d$) is filtered by low pass filter 210 to produce an estimated plant input ($u'_a$). The control signal (u') is subtracted from the estimated plant input (u'$_a$) at summing node 414 and the difference (u'$_a$–u') is filtered by low-pass filter 408.

The estimated plant input (u'$_a$) is provided to constant gain block 410 and subtracted from the product (u$_d$) at summing node 412. The difference (u$_d$–2*u'$_a$) and the filtered difference (u'$_a$–u') from low-pass filter 408 are added together at summing node 414 to form the observed disturbance signal ($\zeta_{obs}$). Q-filter 214 filters the high frequency content from the observed disturbance signal ($\zeta_{obs}$) to form the disturbance compensation signal ($\zeta'$).

In the embodiment shown, a trigger mechanism 416 closes and opens the feedback loop 208 responsive to a magnitude of the PES signal (or responsive to an off-track position error). Consequently, the observer 204 does not always provide feedback to the plant 202. Instead, the trigger mechanism 416 controls the feedback loop 208 such that the disturbance compensation signal ($\zeta'$) is subtracted from the controller output (u) only if the PES is greater than a predetermined threshold, due to external vibrations or shocks. This allows the observer 204 to operate in parallel, for example, with an existing servo control system, which operates to regulate the plant 202 to follow the track under normal operating conditions.

The trigger 416 closes feedback loop 208 only when the PES exceeds a predetermined threshold. The xy-axis graph depicted within trigger 416 illustrates position-error versus logic levels within the trigger. The x-axis represents a position error, and the vertical axis represents positive and negative logic levels (on/off) for the trigger 416 of the RVSC scheme. The position error may be positive or negative. In the tracking state, once the absolute value of the position error exceeds a threshold and the read-write mechanism (such as transducer head 122 in FIG. 1) is "off track", the trigger is 416 turns on (closes) the feedback loop 208. The feedback loop 208 remains closed (meaning that the RVSC scheme remains in an on state) until the position error level is less than a predetermined threshold level or until a time-out counter 418 becomes zero.

It should be understood by workers skilled in the art that the various elements of FIG. 4 may be rearranged and/or combined in certain instances, while maintaining the desired transfer function characteristics. In one embodiment, for example, the trigger mechanism may be combined with the observer, such that the observer estimates a disturbance only when the position error exceeds a predetermined threshold. In another embodiment, the observer 204 and trigger mechanism 402 can be part of the controller 206.

Figure 5:
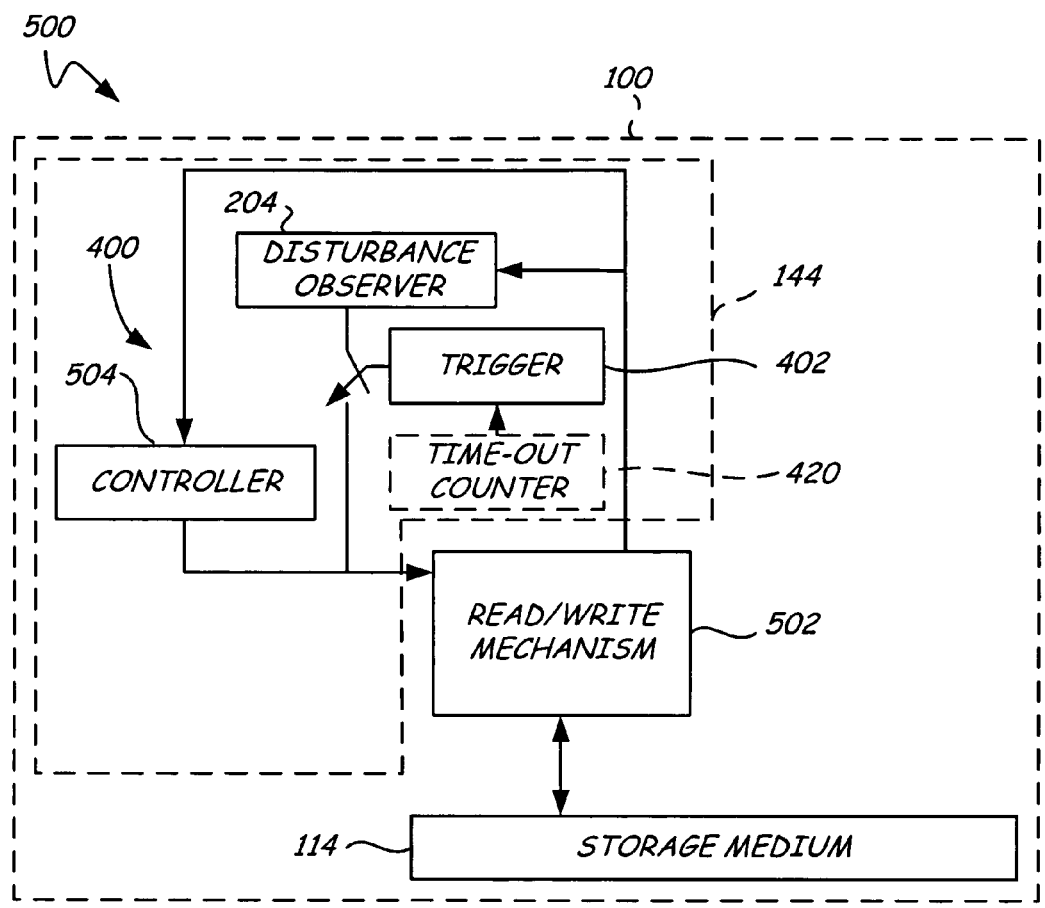
FIG. 5 is a simplified block diagram of a storage device with an RVSC compensation system according to an embodiment of the present invention.

FIG. 5 is a simplified block diagram of a storage system 500 according to an embodiment of the present invention. System 500 includes disc drive 100 with a storage medium 114 and with a random vibration and shock compensation system 400 implemented in circuitry 144. The disc drive 100 includes a read/write mechanism 502, which can include the transducer heads 122, suspension 124, actuator arms 126 and the actuator assembly 128. The drive 100 also includes a controller 504 adapted to control access to the storage medium 114 through the read/write mechanism 502. Additionally, the controller 504 is adapted to generate adjustment signals for positioning the read/write mechanism 502 relative to the storage medium 114, during tracking operations. A disturbance observer 204 monitors a nominal feedback signal, estimates disturbances experienced by the system 500, and generates a disturbance compensation signal responsive to the estimated disturbances. A trigger mechanism 416 enables or disables the disturbance observer 204 responsive to a magnitude of a position error signal. Once engaged, the trigger mechanism 416 continues to enable compensation for the estimated disturbance from the disturbance observer 204 until the magnitude of the position error falls below a threshold level or until an optional time-out counter 418 becomes zero.

It should be understood by workers skilled in the art that, although the controller 504, the disturbance observer 204, and the trigger 416 are shown as separate elements, the elements may be combined within the controller 504. Alternatively, various functional elements of the disc drive 100 may overlap, such that there is no clear-cut distinction between the controller 504 and the disturbance observer 204, for example. In general, the various elements in all of the drawings are called out separately in order to describe functionality, but are not necessarily separate elements or functions in practice.

Figure 6:
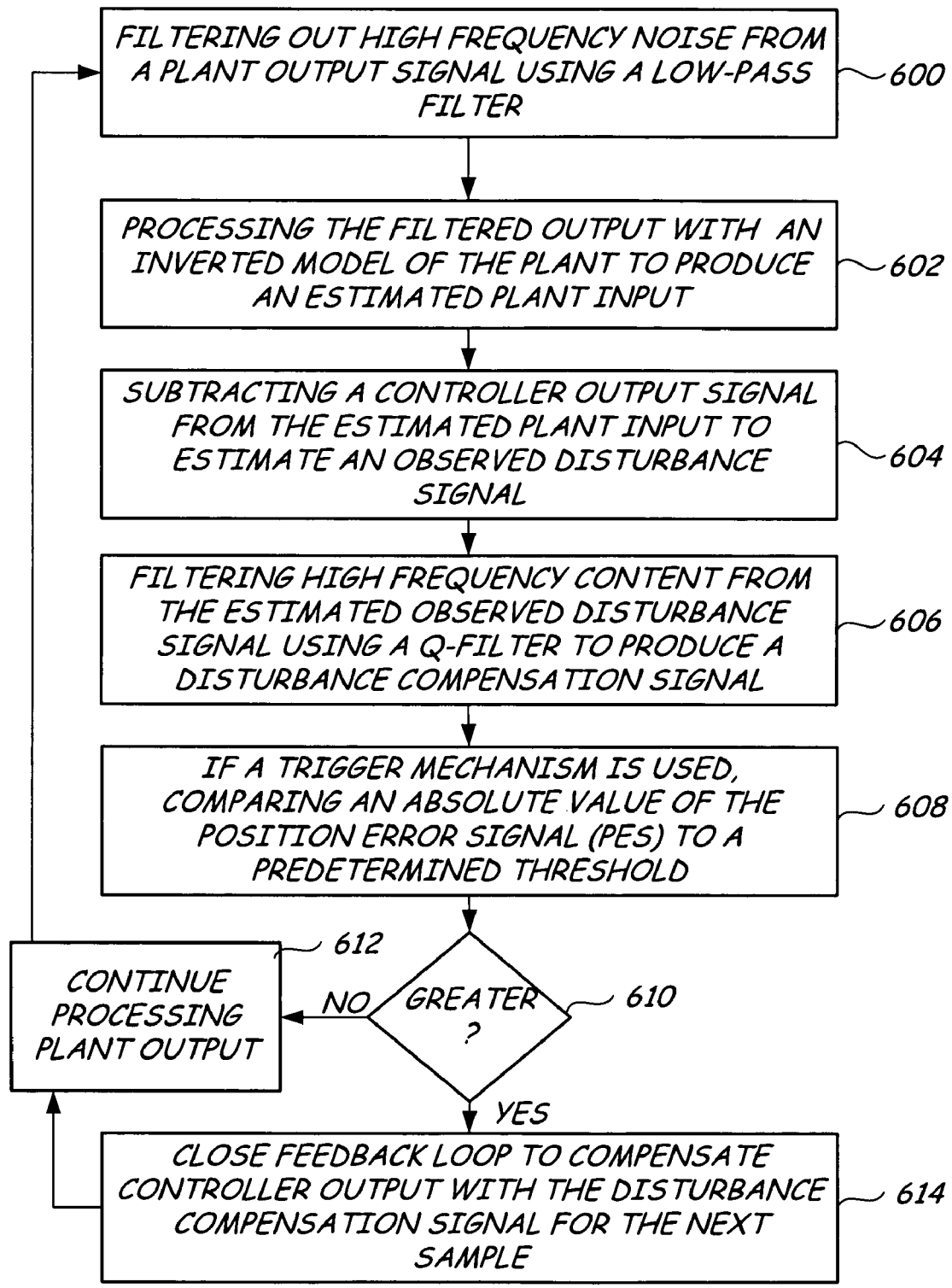
FIG. 6 is a simplified flow diagram of a process for compensating an object position responsive to a disturbance according to an embodiment of the present invention.

FIG. 6 is a simplified flow diagram of a process for compensating a position of a control object responsive to a disturbance according to an embodiment of the present invention. High frequency noise in a plant output (y(t)) is filtered using a low-pass filter (step 600). The filtered output is processed with an inverted model of the plant to produce an estimated plant input (u'$_a$) (step 602). The controller output (u') is subtracted from the estimated plant input (u'$_a$) to produce an observed disturbance signal ($\zeta_{obs}$) (step 604). High frequency content is filtered from the observed disturbance signal ($\zeta_{obs}$) using a Q-filter to produce a disturbance compensation signal ($\zeta'$) (step 606). If a trigger mechanism is present, the absolute value of the PES signal is compared to a predetermined threshold (step 608). If the predetermined threshold is greater than the PES signal (step 610), then the system continues to process the plant output (step 612) and repeats steps 602-608 above. If the PES signal is greater than the predetermined threshold (step 610), the system closes the feedback loop to compensate the controller output (u) with the disturbance compensation signal ($\zeta'$) for the next sample (step 614). The system then proceeds to step 612 and repeats the sequence (steps 602-608).

Figure 7:
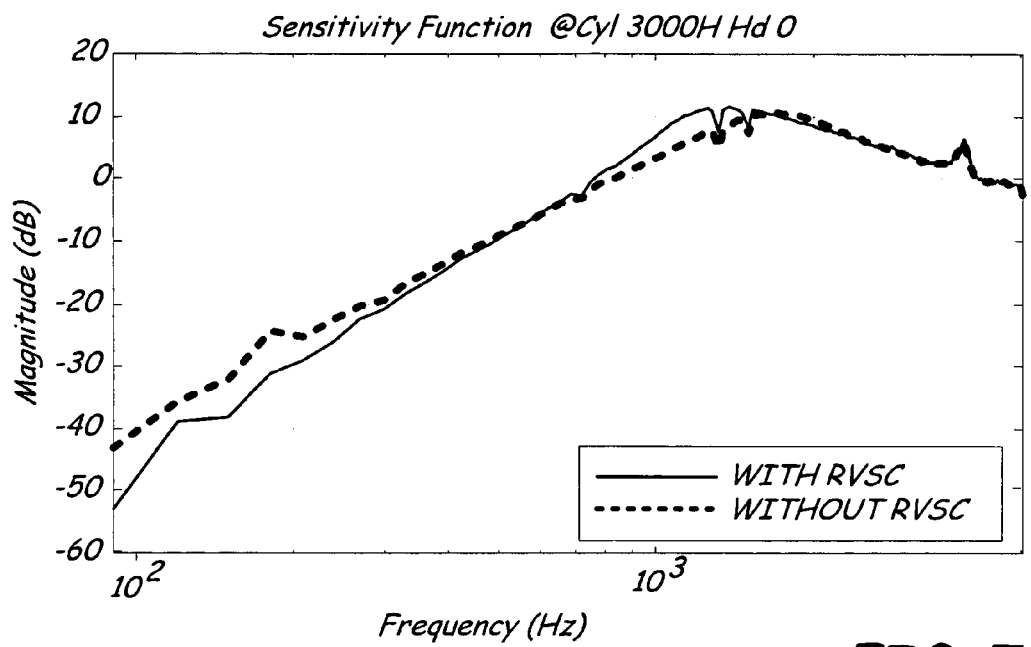
FIG. 7 is a Bode plot of magnitude versus frequency of the disturbance sensitivity transfer function over a range of frequencies for a storage device with and without a random vibration and shock compensation system.

FIG. 7 is a graph of magnitude versus frequency of sensitivity functions for a system with and without an RVSC scheme within a normal operating range according to an embodiment of the present invention. When the random vibration and shock compensation system is adopted, the amplitude of sensitivity function is significantly reduced below 500 Hz. As previously mentioned, 500 Hz is approximately the high end range for random vibration and shock in ordinary physical activities, such as running, cycling and the like, where headphones and a portable device may be used.

Figure 8:
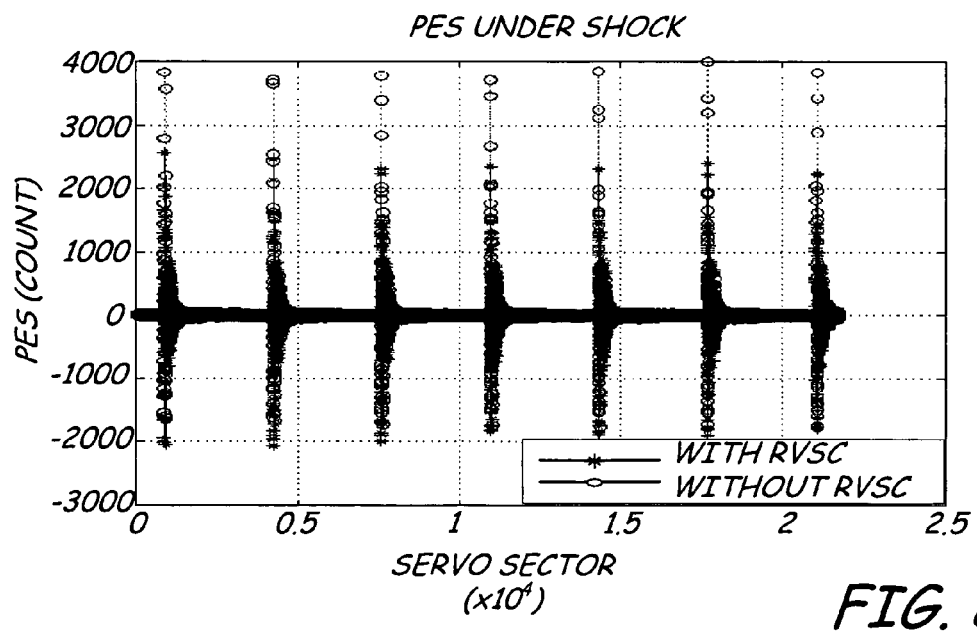
FIG. 8 is a graph of position error signal count versus servo sector responses of a storage device under continuous shock conditions with and without a random vibration and shock compensation system.

FIG. 8 is a graph of PES count versus servo sector for a device under shock conditions with and without RVSC schemes according to an embodiment of the present invention. The shock conditions in FIG. 8 are similar to shock disturbances during jogging while carrying the device. The RVSC feedback system improves the shock and vibration response of the device over a device that uses only standard servo tracking schemes, in the sense that the off-track errors are significantly reduced and the settling performance is improved.

Figure 9A:
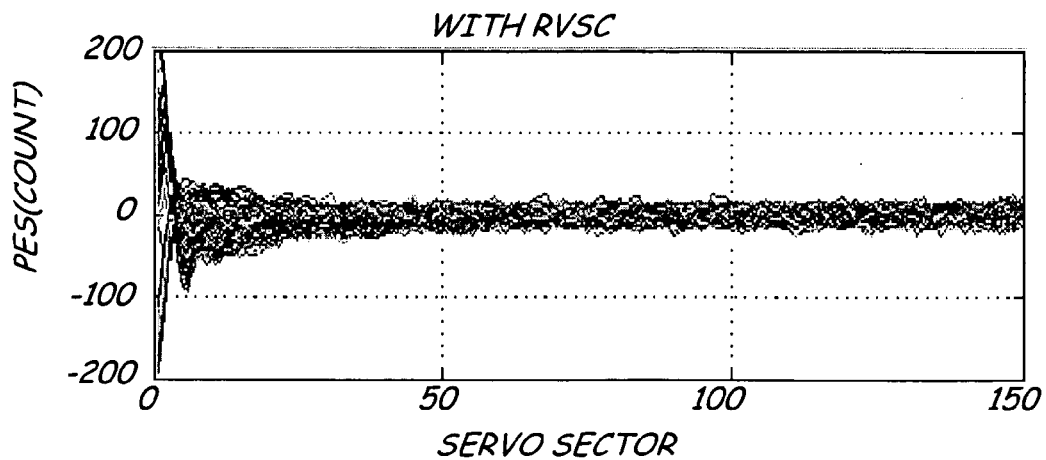
FIGS. 9A and 9B are graphs of position error signal count versus servo sector for a storage device with and without a random vibration and shock compensation system.
Figure 9B:
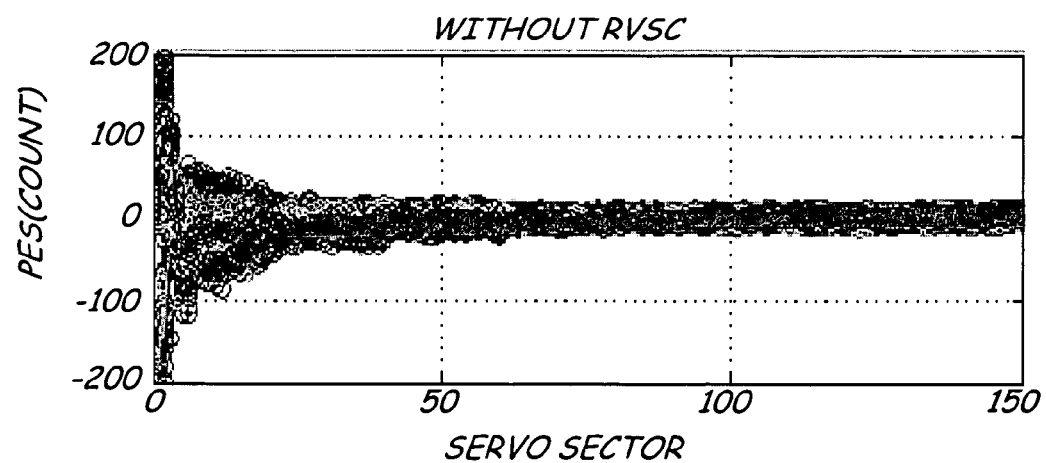

FIGS. 9A and 9B are expanded views of a portion of the graph of FIG. 8. FIG. 9A illustrates the PES count versus servo sector for a device under shock conditions with an RVSC scheme according to an embodiment of the present invention. FIG. 9B illustrates the PES count versus servo sector for a device under shock conditions without an RVSC scheme. The device with RVSC feedback control shows a significant improvement in the number of off-track errors and the settling performance under such conditions, relative to device without RVSC feedback.

Figure 10:
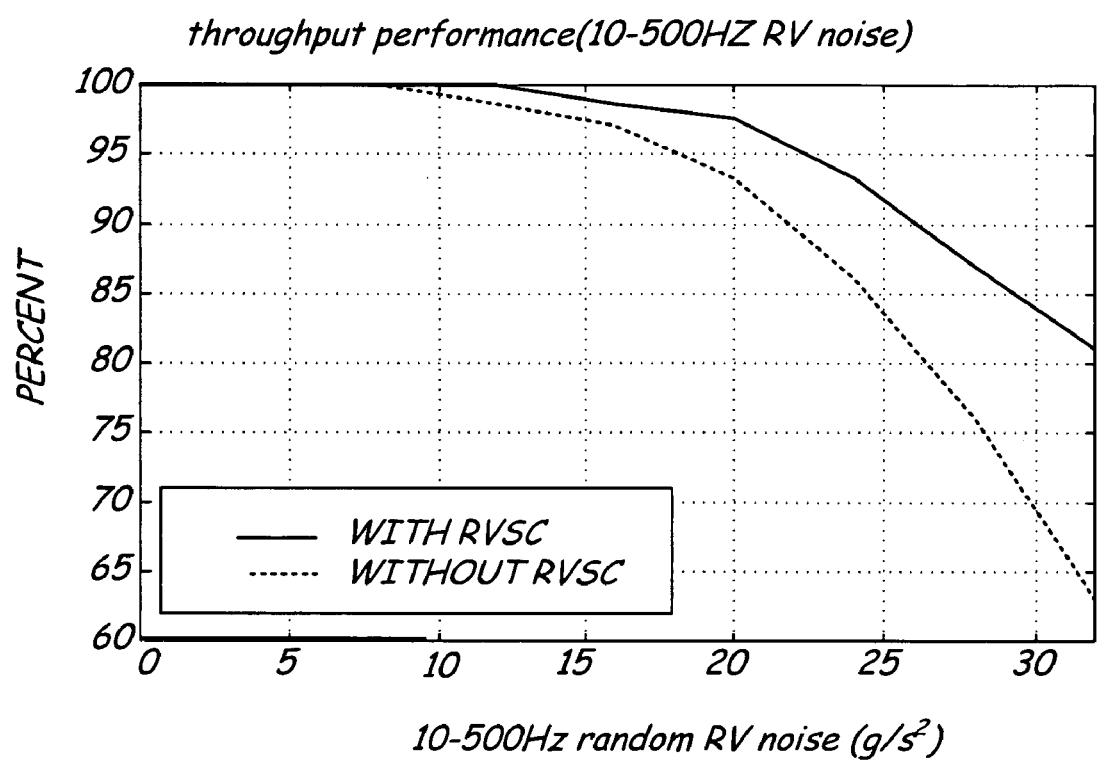
FIG. 10 is a graph of results of throughput performance of a storage device with and without a random vibration and shock compensator.

FIG. 10 is a graph of device performance under random rotary vibration test conditions for a device with and without RVSC feedback compensation schemes. In this instance, the throughput performance of the device was tested over a frequency range of 10 to 500 Hz of random vibration noise. It is assumed that read/write operations per second are 100% when there is no external RV noise, and operations per second will decrease as random vibration disturbances are applied. The graph shows that the device with the RVSC compensation system improves the read/write operations per second as compared to a device that does not have an RVSC compensation system. This test suggests that the triggered observer feedback provided by embodiments of the RVSC compensation scheme of the present invention can greatly improve device performance under adverse conditions, such as jogging, cycling and the like.

TABLE I below shows test data collected during operation of a storage device with and without RVSC compensation during five minutes of jogging.

TABLE I

Test Results.

| | | Jogging | |
|---|---|---|---|
| | Normal Condition | Device without RVSC | Device With RVSC |
| Operations/second | 18.89 | 15.31 | 17.01 |
| % | 100 | 81.05 | 90.05 |

Thus, the RVSC compensation feedback loop improves recovery of a control object, such as a read/write mechanism, during continuous shock conditions. The feedback loop allows for almost two more read-operations per second and nearly a ten percent improvement over a device without RVSC compensation. This means that the read-write mechanism recovers more quickly from each shock, allowing the device to function better than conventional systems in such conditions.

While the above-discussion has been primarily directed to portable storage devices, it should be understood that the RVSC scheme described above may also be employed in non-portable storage devices used in hostile environments. For example, a storage device with a random vibration and shock compensation system can be employed in computing systems for use in sea-going vessels, weather aircraft, and other vehicles and/or devices that can be jolted, tossed, buffeted, and the like, by their environment. Moreover, while the present invention has been described with respect to a storage device, the RVSC scheme may also be used in other control applications, where external shocks and vibrations may alter a desired position of an object.

It is to be understood that, even though numerous characteristics and advantages of various embodiments of the invention have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular application for the random vibration and shock compensation system while maintaining substantially the same functionality without departing from the scope and spirit of the present invention. In addition, although the embodiments described herein are directed to a disturbance compensation system for use in storage systems within portable devices, it will be appreciated by those skilled in the art that the teachings of the present invention can be applied to control of any object that is exposed to external disturbances, without departing from the scope and spirit of the present invention. The present invention includes a control system, disturbance observer and method for controlling position of an object using low frequency components of a disturbance signal.

What is claimed is:

1. A control system for positioning an object susceptible to physical disturbances comprising:
   a disturbance observer adapted to generate a disturbance compensation signal to compensate a position of the object as a function of an estimated physical disturbance responsive to low-frequency components of the estimated physical disturbance, the disturbance observer including a low pass filter configured to filter high frequency components from an output signal from the object related to position of the object which includes sensor noise.

2. The control system of claim 1 further comprising:
   a controller adapted to position the object.

3. The control system of claim 1 wherein the disturbance observer is adapted to estimate physical disturbances to the object and responsively to generate a compensation signal related to the low-frequency components of the estimated physical disturbances.

4. The control system of claim 1 wherein the disturbance observer comprises:
   a double differentiator with a lumped gain parameter adapted to estimate a physical disturbance based on the output signal of the object relative to a position signal from a controller.

5. The control system of claim 1 further comprising:
   a trigger mechanism adapted to enable or disable the disturbance observer responsive to a magnitude of a position error of the object relative to a predetermined threshold.

6. The control system of claim 5 further comprising:
   a time-out counter coupled to the trigger mechanism adapted to disable the disturbance observer after a pre-determined period.

7. The control system of claim 1 wherein the object comprises:
   a read-write head of a data storage device.

8. The control system of claim 7 wherein the read-write head provides a position error signal and the estimated physical disturbance is a function of the position error signal.

9. The control system of claim 7 wherein the data storage device comprises:
   a disc drive and the read-write head is positionable relative to a disc surface.

10. A method of controlling position of an object comprising:
    filtering sensor noise from an output signal from the object related to position of the object with a low pass filter;
    estimating a disturbance of the object related to a difference between a position control signal and low-frequency components of the filtered output signal related to position of the object;
    filtering high frequency components from the estimated disturbance to derive a low-frequency disturbance compensation signal; and adjusting position of the object by applying the low-frequency disturbance compensation signal to an output of a controller.

11. The method of claim 10 wherein the step of estimating comprises:
subtracting the filtered output signal from the position control signal to generate an observed disturbance.

12. The method of claim 10 wherein the step of filtering high frequency content further comprises:
filtering the observed disturbance with a low-pass filter.

13. The method of claim 10 wherein the step of adjusting comprises:
subtracting the low-frequency disturbance compensation signal from the position control signal.

14. The method of claim 10 wherein the step of adjusting comprises:
comparing a magnitude of a position error of the object to a threshold level; and
adjusting the position of the object based on the low-frequency disturbance compensation signal if the magnitude is greater than the threshold level.

15. The method of claim 10 wherein before the step of estimating comprises:
delaying the control signal by a d-step delay to compensate for phase loss due to computational and other delays.

16. The method of claim 10 wherein the step of filtering comprises:
passing the estimated disturbance through a Butterworth low-pass filter.

17. The method of claim 10 wherein the object comprises read-write head.

18. The method of claim 17 wherein the read-write head provides the output as a function of a position error relative to the disc surface.

19. A control system comprising:
a positionable object which provides an output signal related to position;
a controller adapted to position the object; and
a disturbance observer adapted to estimate physical disturbances to the object based upon the output signal and responsively to adjust a position of the object with a disturbance compensation signal based on low-frequency components of the estimated physical disturbances generated from a low pass filter output signal from the object related to position of the object which is applied to an output of the controller.

* * * * *